US012779866B2

(12) United States Patent
Yamashita et al.

(10) Patent No.: US 12,779,866 B2
(45) **Date of Patent: *Nov. 3, 2026**

(54) RECORDING APPARATUS

(71) Applicant: SEIKO EPSON CORPORATION, Tokyo (JP)

(72) Inventors: Yusuke Yamashita, Matsumoto (JP); Satoshi Kaminaga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 18/787,449

(22) Filed: Jul. 29, 2024

(65) Prior Publication Data

US 2024/0383257 A1 Nov. 21, 2024

Related U.S. Application Data

(63) Continuation of application No. 18/306,754, filed on Apr. 25, 2023, now Pat. No. 12,083,803, which is a (Continued)

(30) Foreign Application Priority Data

Sep. 24, 2019 (JP) ................................ 2019-172659

(51) Int. Cl.
*B41J 2/175* (2006.01)

(52) U.S. Cl.
CPC ....... *B41J 2/17566* (2013.01); *B41J 2/17506* (2013.01)

(58) Field of Classification Search
CPC .... B41J 2/175; B41J 2/17503; B41J 2/17506; B41J 2/17509; B41J 2/17566; B41J 2002/17573; B41J 29/13
See application file for complete search history.

(56) References Cited

U.S. PATENT DOCUMENTS 7,552,998 B2 6/2009 Yonekawa et al.
9,421,781 B2 * 8/2016 Kimura ................. B41J 2/1752
(Continued)

FOREIGN PATENT DOCUMENTS

EP 2789465 10/2014
EP 3470229 4/2019
(Continued)

OTHER PUBLICATIONS

US 9,994,032 B2, 06/2018, Nakamura et al. (withdrawn)
US 10,682,862 B2, 06/2020, Mizutani et al. (withdrawn)
US 10,843,475 B2, 11/2020, Mizutani et al. (withdrawn)

*Primary Examiner* — Anh T Vo
(74) *Attorney, Agent, or Firm* — WORKMAN NYDEGGER

(57) ABSTRACT

A recording apparatus includes a carriage configured to move in a width direction intersecting a medium transport direction, a recording head mounted on the carriage, a liquid storage section configured to store a liquid to be supplied to the recording head, the liquid storage section including an injection port configured to receive the liquid from a refill container and a liquid-level visual-check section through which a liquid level of the liquid is visually checked, and a display section configured to accept various setting operations, in which the liquid-level visual-check section and the display section are disposed on an apparatus front surface side, and the display section is disposed above the liquid-level visual-check section.

20 Claims, 6 Drawing Sheets

Related U.S. Application Data continuation of application No. 17/646,161, filed on Dec. 28, 2021, now Pat. No. 11,701,897, which is a continuation of application No. 17/028,313, filed on Sep. 22, 2020, now Pat. No. 11,331,929.

(56) References Cited

U.S. PATENT DOCUMENTS

| | | | | |
|---|---|---|---|---|
| 9,643,421 | B2 | 5/2017 | Kanaya et al. | |
| 9,908,337 | B2 | 3/2018 | Kanaya et al. | |
| 10,040,293 | B2 | 8/2018 | Nakamura et al. | |
| 10,152,659 | B2 | 12/2018 | Kawana | |
| 10,252,539 | B2 | 4/2019 | Shimizu | |
| 10,308,029 | B2 | 6/2019 | Kudo et al. | |
| 10,336,065 | B2 | 7/2019 | Horade | |
| 10,343,409 | B2 | 7/2019 | Higuchi et al. | |
| 10,350,901 | B2 | 7/2019 | Mizutani et al. | |
| 10,471,723 | B2 | 11/2019 | Fukasawa et al. | |
| 10,717,287 | B2 | 7/2020 | Mizutani et al. | |
| 10,752,003 | B2 | 8/2020 | Mizutani et al. | |
| 10,889,123 | B2 | 1/2021 | Mizutani et al. | |
| 11,331,929 | B2 | 5/2022 | Yamashita et al. | |
| 11,787,196 | B2 * | 10/2023 | Yamashita | B41J 2/17506 347/7 |
| 12,083,803 | B2 * | 9/2024 | Yamashita | B41J 2/17506 |
| 2006/0082622 | A1 | 4/2006 | Yonekawa et al. | |
| 2007/0211131 | A1 | 9/2007 | Iijima | |
| 2013/0169720 | A1 | 7/2013 | Nakamura et al. | |
| 2013/0188209 | A1 | 7/2013 | Horikawa et al. | |
| 2014/0104349 | A1 | 4/2014 | Kimura et al. | |
| 2015/0284170 | A1 | 10/2015 | Igarashi et al. | |
| 2016/0121619 | A1 | 5/2016 | Tomoguchi | |
| 2016/0214393 | A1 | 7/2016 | Matsui et al. | |
| 2016/0221347 | A1 | 8/2016 | Kanaya et al. | |
| 2016/0221348 | A1 | 8/2016 | Nakamura et al. | |
| 2016/0350637 | A1 | 12/2016 | Kawana | |
| 2017/0355191 | A1 | 12/2017 | Mizutani et al. | |
| 2017/0355194 | A1 | 12/2017 | Fukasawa et al. | |
| 2017/0355195 | A1 | 12/2017 | Fukasawa et al. | |
| 2017/0355196 | A1 | 12/2017 | Shinada et al. | |
| 2017/0355197 | A1 | 12/2017 | Kudo et al. | |
| 2018/0147853 | A1 | 5/2018 | Shimizu | |
| 2018/0170064 | A1 | 6/2018 | Higuchi et al. | |
| 2018/0257383 | A1 | 9/2018 | Nakamura et al. | |
| 2019/0092029 | A1 | 3/2019 | Nakamura et al. | |
| 2019/0299624 | A1 | 10/2019 | Mizutani et al. | |
| 2019/0299625 | A1 | 10/2019 | Mizutani et al. | |
| 2020/0070523 | A1 | 3/2020 | Fukasawa et al. | |
| 2020/0282730 | A1 | 9/2020 | Mizutani et al. | |
| 2020/0298579 | A1 | 9/2020 | Mizutani et al. | |
| 2022/0118770 | A1 | 4/2022 | Yamashita et al. | |

FOREIGN PATENT DOCUMENTS

| | | |
|---|---|---|
| JP | 2006-110946 | 4/2006 |
| JP | 2007-168134 | 7/2007 |
| JP | 2013-150247 | 8/2013 |
| JP | 2015-096303 | 5/2015 |
| JP | 2016-132206 | 7/2016 |
| JP | 2016-221761 | 12/2016 |
| JP | 2017-001249 | 1/2017 |
| JP | 2018-069697 | 5/2018 |
| JP | 2018-089814 | 6/2018 |
| JP | 2019-042962 | 3/2019 |
| JP | 2019-048479 | 3/2019 |
| JP | 2019-142116 | 8/2019 |

* cited by examiner

RECORDING APPARATUS

The present application is a continuation of U.S. patent application Ser. No. 18/306,754, filed Apr. 25, 2023, which is a continuation of U.S. patent application Ser. No. 17/646,161, filed Dec. 28, 2021 and issued as U.S. Pat. No. 11,701,897 on Jul. 18, 2023, which is a continuation of U.S. patent application Ser. No. 17/028,313, filed Sep. 22, 2020 and issued as U.S. Pat. No. 11,331,929 on May 17, 2022, which is based on, and claims priority from JP Application Serial Number 2019-172659, filed Sep. 24, 2019, the disclosures of which are hereby incorporated by reference herein in their entirety.

BACKGROUND

1. Technical Field

The present disclosure relates to a recording apparatus.

2. Related Art

Liquid discharge apparatuses (recording apparatuses) with a refillable ink (liquid) tank and a recording head for discharging the liquid supplied from the ink tank via nozzles to form an image on a medium are known, for example, in JP-A-2019-48479. The recording apparatus described in JP-A-2019-48479 includes a recording section for recording an image on a medium, a transport roller section for feeding the medium toward the recording section, a discharging roller section for discharging the image-recorded medium from the recording section, an ink tank that stores a liquid that is supplied to a recording head, an optical sensor for detecting a remaining amount of the liquid in the ink tank, and a display section for displaying various kinds of information. When the level of the liquid in the ink tank becomes low, the user is prompted to refill the ink tank with the liquid, and the user refills the ink tank with the liquid.

In the recording apparatus described in JP-A-2019-48479, however, the ink tank that stores the liquid to be supplied to the recording head is apart from the display section for displaying various kinds of information. Accordingly, for example, it may be difficult for the user to refill the ink tank with the liquid while referring to the information displayed on the display section, and the user may improperly perform the ink refilling operation to the ink tank.

SUMMARY

According to an aspect of the present disclosure, a recording apparatus includes a carriage configured to move in a width direction intersecting a medium transport direction, a recording head mounted on the carriage, a liquid storage section configured to store a liquid to be supplied to the recording head, the liquid storage section including an injection port configured to receive the liquid from a refill container and a liquid-level visual-check section through which a liquid level of the liquid is visually checked, and a display section configured to provide operation guidance, in which the liquid-level visual-check section and the display section are disposed on an apparatus front surface side, and the display section is disposed above the liquid-level visual-check section.

The recording apparatus may further include a storage case accommodating the liquid storage section, in which the storage case has an opening through which the liquid-level visual-check section is visually checked, and a front surface of the storage case having the opening and a surface of the display section are flush with each other.

In the recording apparatus according, the liquid-level visual-check section and the display section may be disposed in one end portion of the apparatus front surface in the width direction.

The recording apparatus may further include a discharge section configured to discharge the medium, in which the liquid-level visual-check section and the discharge section are adjacent to each other in the width direction.

The recording apparatus may further include a sheet feed tray configured to feed the medium, in which the liquid-level visual-check section and the sheet feed tray are adjacent to each other in the width direction.

In the recording apparatus, the color of the liquid-level visual-check section and the color of a casing in the display section may be the same dark color.

In the recording apparatus, the liquid-level visual-check section and the display section may protrude from the apparatus front surface in a direction intersecting the width direction.

In the recording apparatus, when viewed in the direction intersecting the transport direction and the width direction, a part of the display section may overlap at least one of the discharge section and the sheet feed tray.

In the recording apparatus, the display section may be configured to be tilted.

The recording apparatus may further include a front door disposed on the apparatus front surface side in the width direction with respect to the liquid-level visual-check section, in which when the apparatus front surface is viewed from the front side, an edge of the front door and front surfaces of the display section and the storage case are disposed in the same line.

The recording apparatus may further include a scanner section turnably attached to the apparatus body, in which the display section is attached to an end of the scanner section, and is configured to be turned together with the scanner section.

In the recording apparatus, the liquid supplied to the recording head may be suppled from the liquid storage section through a tube.

DESCRIPTION OF EXEMPLARY EMBODIMENTS

1. First Embodiment

1. 1 Overview of Recording Apparatus

Figure 1:
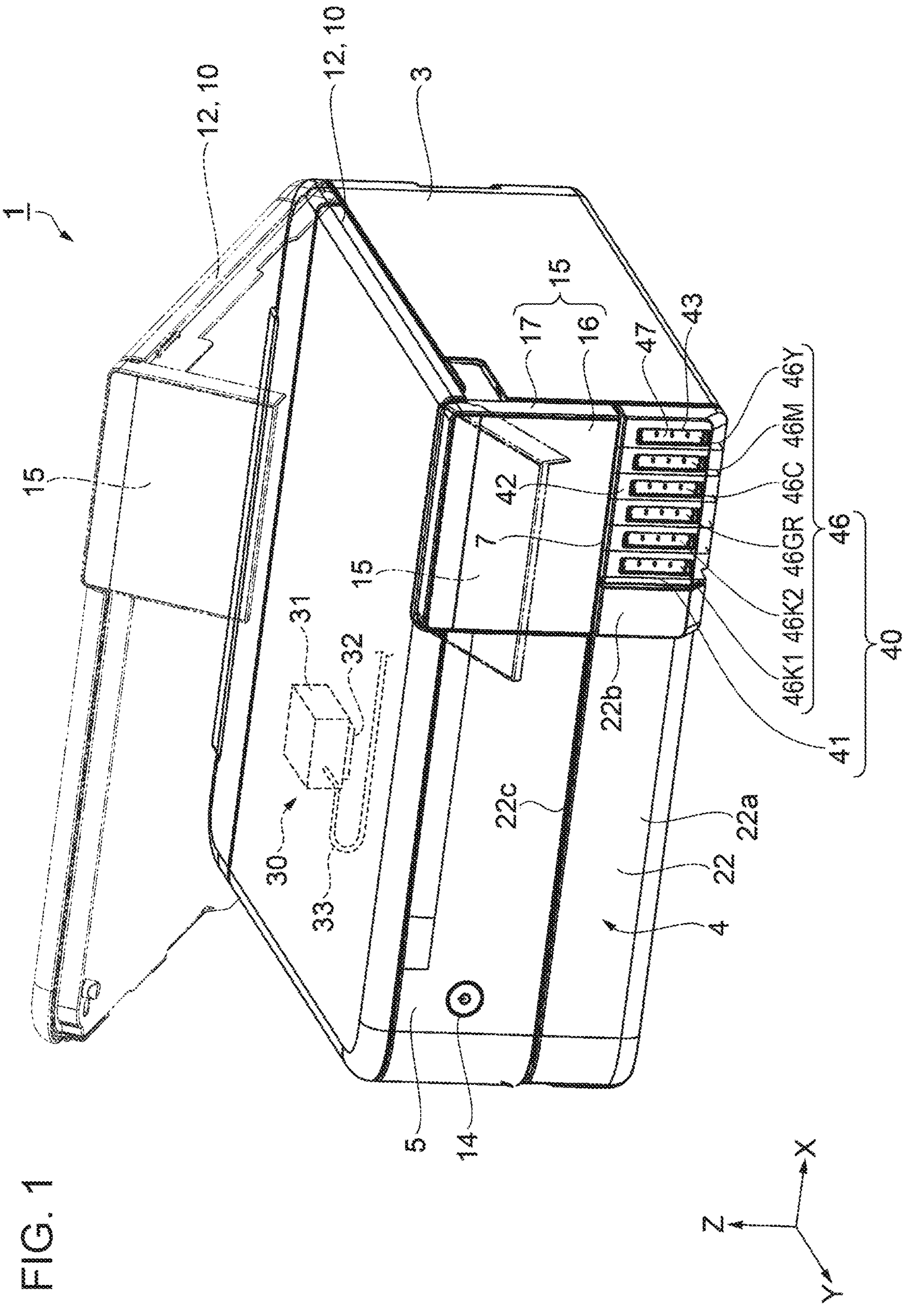
FIG. 1 is a perspective view of a recording apparatus according to a first embodiment.
Figure 2:
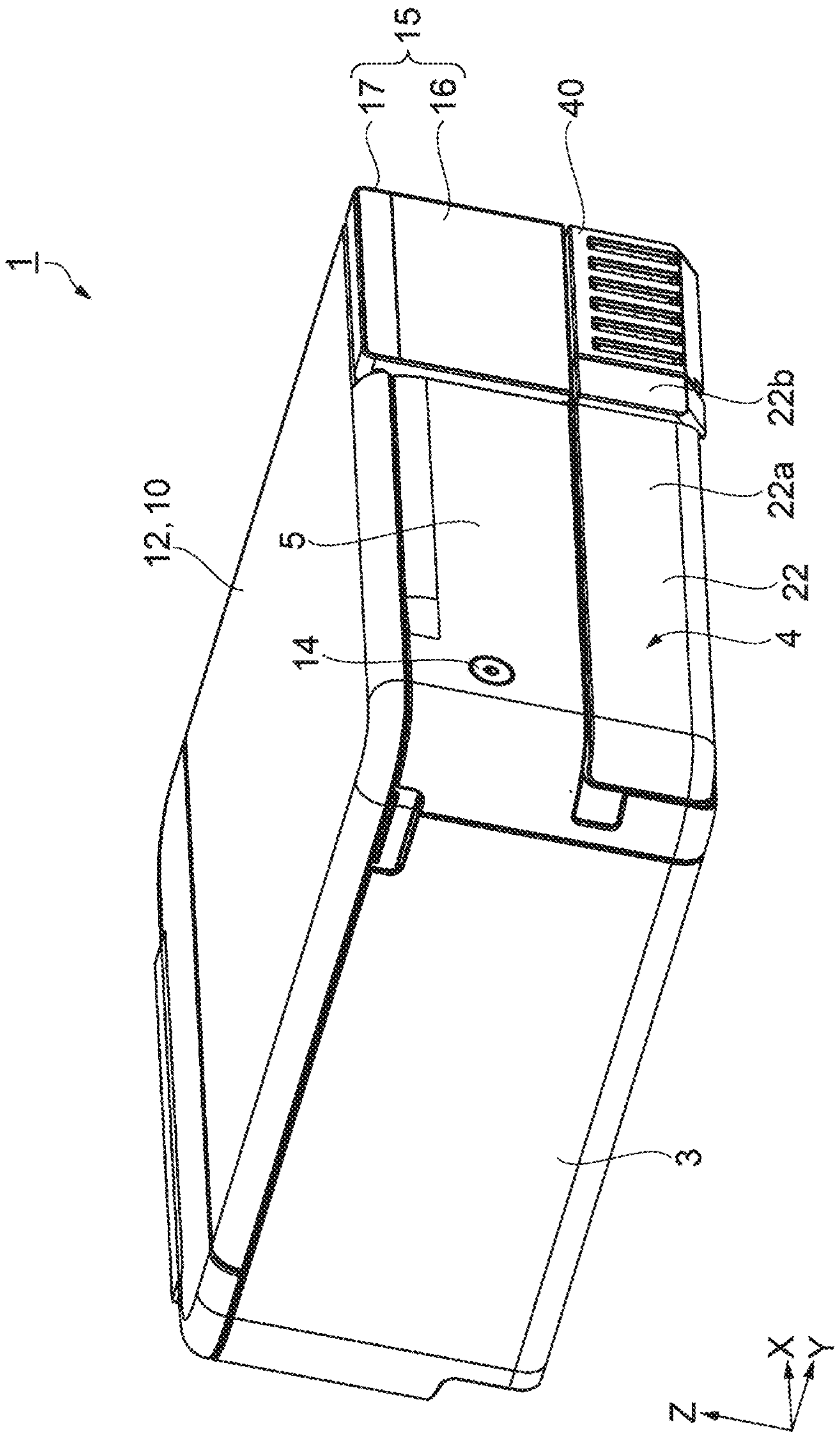
FIG. 2 is a perspective view of the recording apparatus according to the first embodiment.
Figure 3:
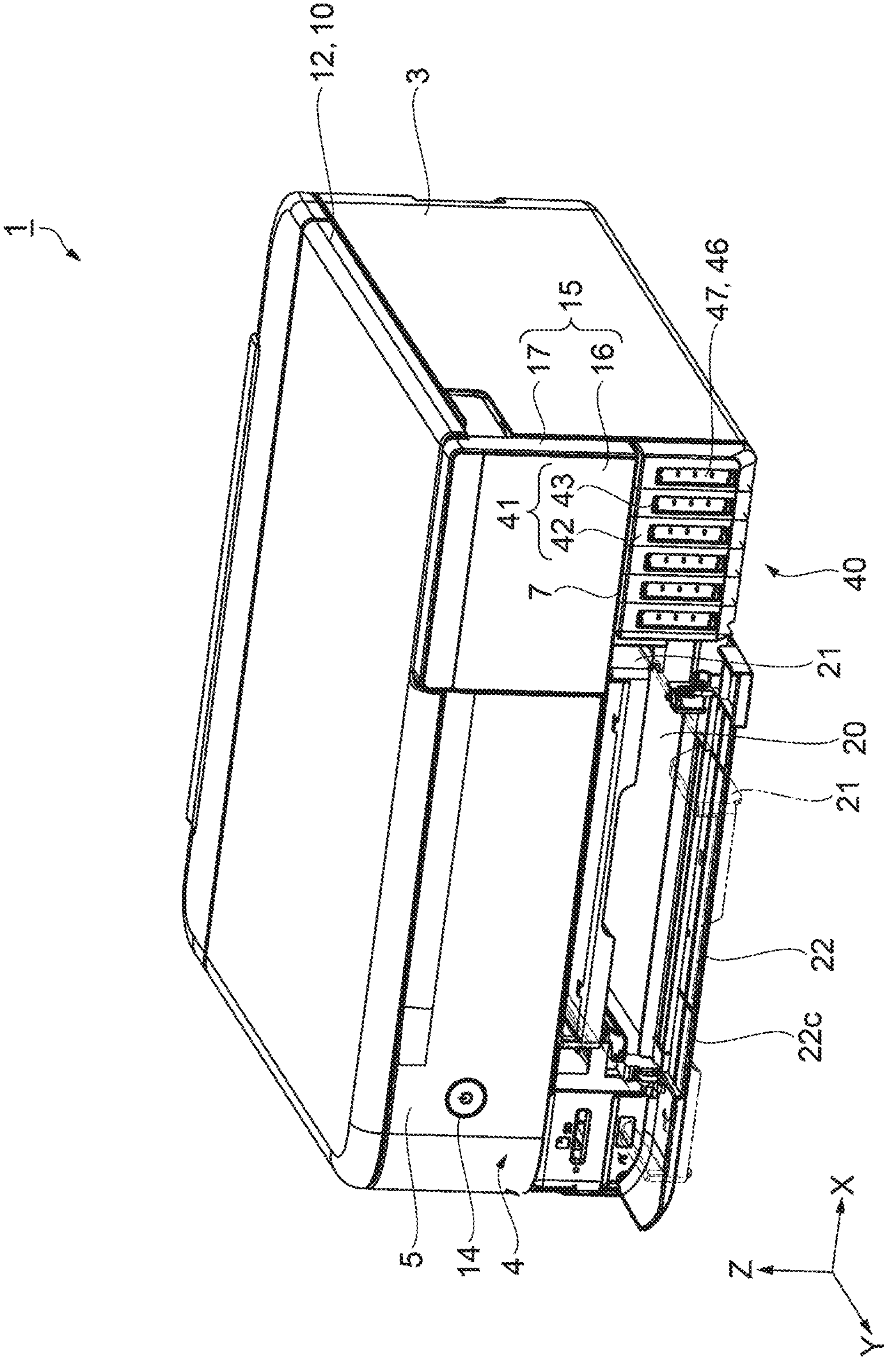
FIG. 3 is a perspective view of the recording apparatus according to the first embodiment.
Figure 4:
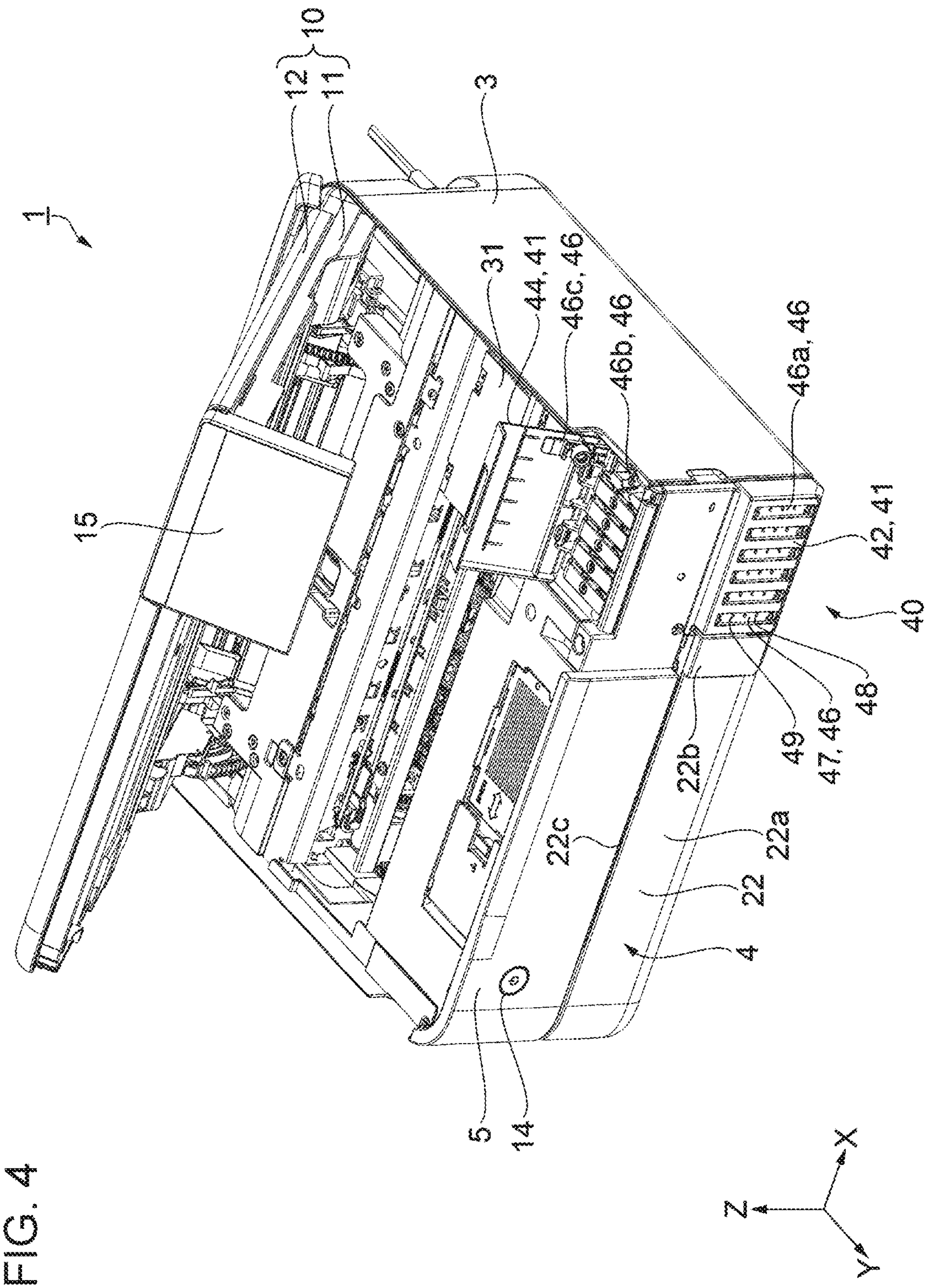
FIG. 4 is a perspective view of the recording apparatus according to the first embodiment.
Figure 5:
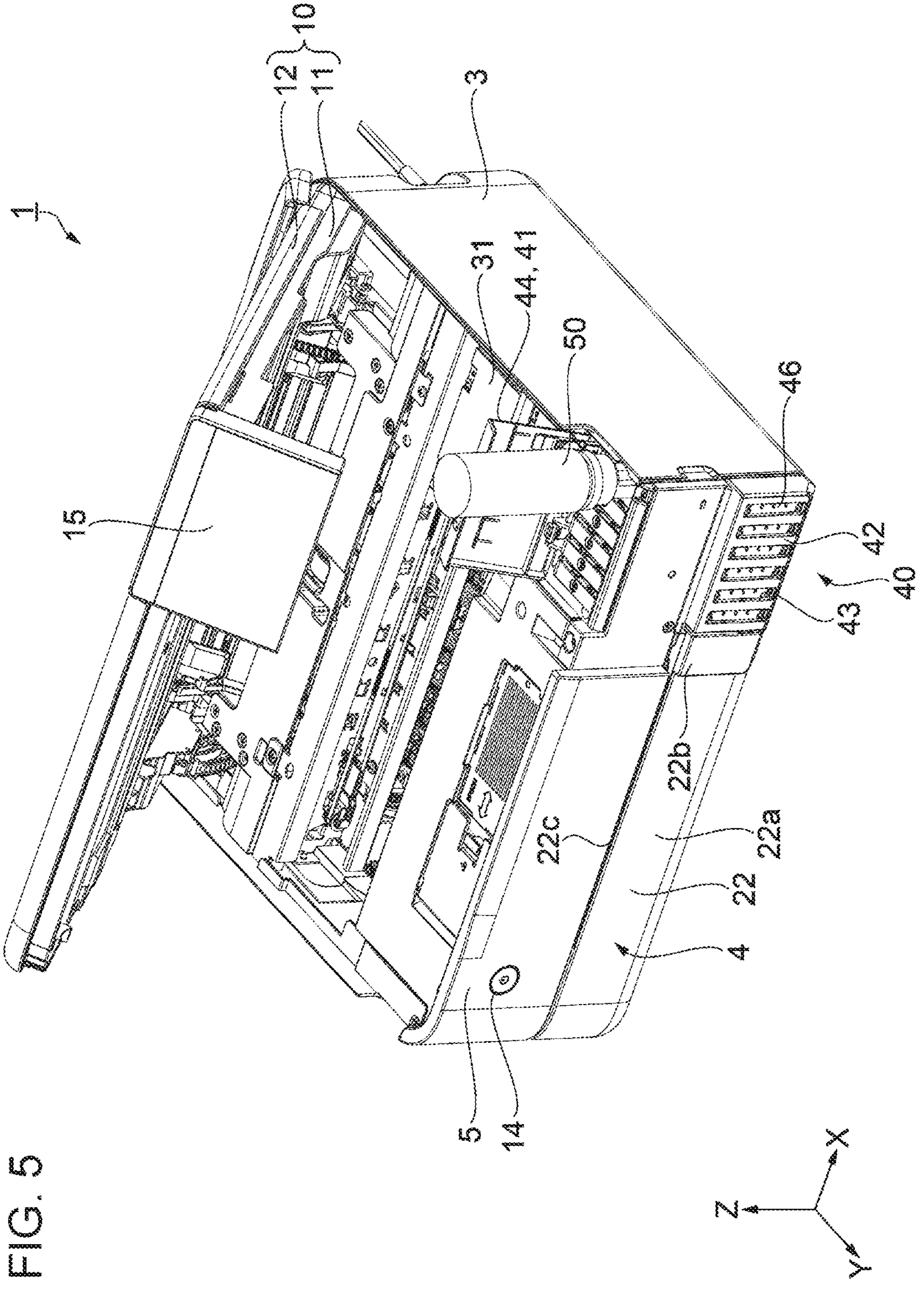
FIG. 5 is a perspective view of the recording apparatus according to the first embodiment.

FIG. 1 is a perspective view of a recording apparatus 1 according to a first embodiment. FIG. 2 is a perspective view of the recording apparatus 1 according to the first embodiment. FIG. 3 to FIG. 5 are perspective views of the recording apparatus 1 according to the embodiment. FIG. 1 to FIG. 3 illustrate a scanner section 10 that is closed with respect to an apparatus body 3. FIG. 4 and FIG. 5 illustrate the scanner section 10 that is open with respect to the apparatus body 3. In FIG. 5, an ink tank 46Y is refilled with a yellow liquid from a refill container 50. First, with reference to FIG. 1 to FIG. 3, an overview of the recording apparatus 1 according to the embodiment will be described.

As illustrated in FIG. 1 and FIG. 2, the recording apparatus 1 according to the embodiment includes the rectangular parallelepiped apparatus body 3 and the scanner section 10 that is attached to an upper portion of the apparatus body 3, and the recording apparatus 1 is installed on a horizontal surface. In the following description, an X direction denotes a long-side direction (width direction) of the rectangular parallelepiped apparatus body 3, a Y direction denotes a short-side direction (depth direction) of the apparatus body 3, and a Z direction denotes a height direction of the apparatus body 3. In addition, a + direction denotes a tip side of an arrow that indicates a direction, and a − direction denotes a base end side of the arrow that indicates the direction. The +Y direction side of the apparatus body 3 is an example apparatus front surface in the embodiments of the present application, and hereinafter, referred to as an apparatus front surface 4. When the apparatus front surface 4 is viewed from the +Y direction side, the apparatus front surface according to the present application is viewed from the front side.

The scanner section 10 is disposed on an upper portion of the apparatus body 3 such that the scanner section 10 can be turned with respect to the apparatus body 3 (see FIG. 1 and FIG. 4). The scanner section 10 includes a scanner housing 11 (see FIG. 4) that reads a document mounted on the scanner housing 11, and an upper cover 12. The scanner housing 11 and the upper cover 12 are stacked. The upper cover 12 is a cover for protecting the scanner housing 11, and can be turned with respect to the scanner housing 11 as illustrated by chain double-dashed lines in the drawings. A display section 15 is attached to an end portion of the upper cover 12 on the +Y-direction side.

As illustrated by solid lines and chain double-dashed lines in the drawings, the display section 15 can be turned together with the upper cover 12 with respect to the scanner housing 11 and can be tilted with respect to the upper cover 12. That is, the display section 15 is attached to an end of the scanner section 10, and can be turned together with the scanner section 10, and can be tilted. The display section 15 is a liquid crystal display module that includes a touch panel. The display section 15 includes a display panel 16 that has a touch panel and a casing 17. The display section 15 has a mechanism (display function) that accept various setting operations of the recording apparatus 1 and a function for setting various settings to the recording apparatus 1. The user can tilt the display section 15 to a position for easy viewing and perform various operations to the recording apparatus 1 while referring to images displayed on the display sections 15. Furthermore, the user can tilt the display section 15 to a position where the user can readily touch the display section 15 and set various settings to the recording apparatus 1 via the display section 15. As described above, the recording apparatus 1 has the display section 15 that accept various setting operations to the recording apparatus 1. The display section 15 that can be tilted to the upper cover 12 enables the user to readily refer to the operation guidance displayed on the display section 15 and set various settings to the recording apparatus 1.

As illustrated in FIG. 5, the user turns the display section 15 together with the scanner section 10 to open the scanner section 10 with the display section 15 attached thereto with respect to the apparatus body 3, and refills an ink tank 46 with a liquid from the refill container 50. When the liquid is supplied from the refill container 50 into the ink tank 46, the display section 15 is disposed away from the ink tank 46, and thus the display section 15 does not interfere with the operation of supplying the liquid from the refill container 50 into the ink tank 46. Consequently, the large display section 15 can be provided. With the structure in which the display section 15 is attached to the end of the scanner section 10 and the display section 15 can be turned together with the scanner section 10, the large display section 15 can be provided, enabling the user to readily visually check images for operation guidance that are displayed on the display section 15.

Returning to FIG. 1 and FIG. 2, in the apparatus body 3, a recording section 30 is disposed. The recording section 30 can record images on a medium with a liquid. The recording section 30 includes a carriage 31, a recording head 32 that is mounted on the carriage 31, and a tube 33 for supplying a liquid to the recording head 32. The tube 33 is coupled to the recording section 30 and the liquid storage section 40. A liquid stored in the liquid storage section 40 is supplied to the recording section 30 through the tube 33.

The carriage 31 is supported by a guide shaft (not illustrated), and can be moved in a width direction of a medium that intersects a transport direction in which the medium is transported. In this embodiment, the width direction is the +X direction or the −X direction, which is an example medium width direction that intersects the medium transport direction according to the present application. The carriage 31 can be moved in the medium width direction (+X direction or −X direction). The recording head 32 can be moved together with the carriage 31 in the medium width direction. The recording head 32 includes a common liquid chamber (not illustrated), pressure generating chambers (not illustrated), piezoelectric elements (not illustrated), nozzles (not illustrated), and the like to discharge a liquid onto a medium. In the recording apparatus 1, the recording head 32 alternately repeats discharging a liquid onto a medium while moving in the medium width direction and transporting the medium in the transport direction to record a desired image on the medium.

In an upper portion of the apparatus front surface 4 on the +X-direction side, the display section 15 is disposed, and in a lower portion of the apparatus front surface 4 on the +X direction side, a liquid-level visual-check section 42 of a storage case 41 is disposed. The display section 15 is, accordingly, disposed above the liquid-level visual-check section 42 and near the liquid-level visual-check section 42. As described above, the recording apparatus 1 has the display section 15 that is disposed above the liquid-level visual-check section 42. In the apparatus front surface 4, a front side casing 5 is disposed on the −X-direction side with respect to the display section 15, and a front door 22 is disposed on the −X-direction side with respect to the liquid-level visual-check section 42. The front side casing 5 includes a power button 14 for turning on or off the power. As described above, the recording apparatus 1 has the front door 22 that is disposed on the medium width direction side (−X-direction side) with respect to the liquid-level visual-check section 42. The front door 22 can be opened or closed with respect to the apparatus body 3 (see FIG. 1 and FIG. 3).

As will be described in detail below, the liquid storage section 40 includes the storage case 41 and the ink tank 46 that is stored in the storage case 41. A surface of the storage case 41 on the +Y-direction side is the liquid-level visual-check section 42. Through the liquid-level visual-check section 42 of the storage case 41, the user can visually check a liquid level of a liquid that is stored in the ink tank 46 in the storage case 41. The recording apparatus 1 has the display section 15 and the liquid-level visual-check section 42 that are disposed in one end portion of the apparatus front surface 4 on the medium width direction side (+X-direction side of the apparatus front surface 4). The display section 15 and the liquid-level visual-check section 42 may be disposed not on the +X-direction side of the apparatus front surface 4 but on the −X-direction side of the apparatus front surface 4. The arrangement in which the liquid-level visual-check section 42 and the display section 15 are disposed on one end side of the apparatus front surface 4 in the medium width direction enables the display section 15 to be disposed above the liquid-level visual-check section 42, and thus the display section 15 can be disposed near the liquid-level visual-check section 42.

On the apparatus front surface 4, the +Y-direction side surface of the display section 15 is flush with the +Y-direction side surface of the front surface of the storage case 41. In the recording apparatus 1, accordingly, the display section 15 is not flush with the liquid-level visual-check section 42 but the +Y-direction side surface of the display section 15 is flush with the +Y-direction side surface of the front surface of the storage case 41. The arrangement in which the +Y-direction side surface of the display section 15 is flush with the +Y-direction side surface of the front side of the storage case 41 enables the display section 15 to be disposed near the storage case 41, and thus the display section 15 can be disposed near the liquid-level visual-check section 42. It should be noted that the display section 15 may be flush with the liquid-level visual-check section 42. Furthermore, on the apparatus front surface 4, the +Y-direction side surface of the display section 15 and the +Y-direction side surface of the front surface of the storage case 41 are disposed on the +Y-direction side with respect to the +Y-direction side surface of the front side casing 5, and protrude in the +Y direction that intersects the medium width direction (+X direction, −X direction). As described above, the recording apparatus 1 has the display section 15 and the liquid-level visual-check section 42 that protrude in the direction that intersects the medium width direction. With the liquid-level visual-check section 42 and the display section 15 that protrude in the direction that intersects the medium width direction, as compared with a structure in which the liquid-level visual-check section 42 and the display section 15 do not protrude in the direction that intersects the medium width direction, the volume of the ink tank 46 in the liquid storage section 40 can be increased, and thus the liquid storage section 40 can store a large amount of liquid.

In the front door 22, a portion 22*a* that is disposed on the −Z-direction side with respect to the front side casing 5 is flush with the front side casing 5. Furthermore, in the front door 22, a portion 22*b* that is disposed on the +X-direction side is disposed on the +Y-direction side with respect to the +Y-direction side surface of the front side casing 5, and protrudes in the +Y direction that intersects the medium width direction. The front door 22 includes the portion 22*b* that protrudes in the +Y direction that intersects the medium width direction and the portion 22*a* that is flush with the front side casing 5. The portion 22*b* in the front door 22, the +Y-direction side surface of the display section 15, and the +Y-direction side surface of the front surface of the storage case 41 are flush with each other.

An edge 22*c* of the front door 22 on the +Z-direction side is an example edge of the front door according to the present application. The edge 22*c* of the front door 22 is a portion of the front door 22 at a boundary between the front side casing 5. When the apparatus front surface 4 is viewed in the +Y direction (when the apparatus front surface 4 is viewed from the front side), it can be considered that the edge 22*c* of the front door 22 and a boundary 7 between the liquid-level visual-check section 42 and the display section 15 are disposed in visually substantially the same line. When the apparatus front surface 4 is viewed from the front side, accordingly, in the recording apparatus 1, the edge 22*c* of the front door 22 and the boundary 7 between the display section 15 and the liquid-level visual-check section 42 are disposed in substantially the same line. In the structure in which the edge 22*c* of the front door 22 and the boundary 7 between the display section 15 and the liquid-level visual-check section 42 are disposed in the same line, the front door 22 is prevented from interfering with the display section 15 and the liquid-level visual-check section 42, enabling the front door 22 to be readily opened or closed. In the present application, being disposed in the same line means a state in which being disposed in visually substantially the same line, and thus, for example, a portion that is not in the same line may be included. Furthermore, in the present application, being flush with each other means a state in which being visually substantially flush with each other, and thus, for example, a portion that is not flush with each other may be included.

As illustrated in FIG. 3, the apparatus body 3 accommodates a sheet feed tray 20 and a discharge tray 21 that is an example discharge section. The discharge tray 21 is disposed above the sheet feed tray 20. More specifically, the discharge tray 21 is disposed on the +Z-direction side with respect to the sheet feed tray 20, and the sheet feed tray 20 is disposed on the −Z-direction side with respect to the discharge tray 21. When the front door 22 is opened with respect to the apparatus body 3, the sheet feed tray 20 and the discharge tray 21 are exposed, and then the discharge tray 21 and the sheet feed tray 20 can be inserted into or removed from the apparatus body 3.

The sheet feed tray 20 can store a medium. The user inserts the sheet feed tray 20 with a medium stored therein into the apparatus body 3 to set the medium in the apparatus body 3. In a state in which the front door 22 is open with respect to the apparatus body 3 and a part of the discharge tray 21 is pulled out to the outside of the apparatus body 3 as illustrated by chain double-dashed lines in FIG. 3, the recording apparatus 1 performs recording to the medium. The medium stored in the sheet feed tray 20 is fed toward the recording section 30 while being bent in the apparatus body 3 so that its orientation is reversed, and after image recording is performed in the recording section 30, the medium is fed toward the discharge tray 21 and discharged onto the discharge tray 21. In the recording section 30, the recording head 32 alternately repeats discharging a liquid onto the medium while moving in the medium width direction (+X direction, −X direction) and transporting the medium in the transport direction to record a desired image on the medium. The medium transport direction according to the present application is a direction (+Y direction) in which a medium is transported in the recording section 30. In the present application, a direction that intersects the transport direction (+Y direction) and the width direction (+X direction, −X direction) is the Z direction. When the apparatus is viewed in the Z direction, it corresponds to a case in which the apparatus is viewed in the direction that intersects the transport direction and the width direction in the present application.

In this embodiment, the position of the liquid-level visual-check section 42 in the medium width direction (the position in the X direction) and the position of the discharge tray 21 in the medium width direction differ from each other, and the position of the liquid-level visual-check section 42 in the medium width direction and the position of the sheet feed tray 20 in the medium width direction differ from each other. With this structure, the liquid-level visual-check section 42 is prevented from interfering with the discharge tray 21 and the sheet feed tray 20, enabling the user to readily visually check the ink tank 46 through the liquid-level visual-check section 42. Furthermore, when viewed in the Z direction, a part of the display section 15 overlaps with the discharge tray 21 and the sheet feed tray 20. With this structure, the dimension (dimension in the X direction) of the recording apparatus 1 in the medium width direction can be shortened, and the compact recording apparatus 1 can be provided. When viewed in the Z direction, a part of the display section 15 may overlap with either the discharge tray 21 or the sheet feed tray 20, or may overlap with both the discharge tray 21 and the sheet feed tray 20. That is, when viewed in the Z direction, a part of the display section 15 may overlap with at least one of the discharge tray 21 and the sheet feed tray 20.

1. 2. Overview of Liquid Storage Section

With reference to FIG. 1, FIG. 4, and FIG. 5, an overview of a liquid storage section 40 will be described. As illustrated in FIG. 1 and FIG. 4, the liquid storage section 40 includes the storage case 41 and the ink tank 46 that is accommodated in the storage case 41. The ink tank 46 stores a liquid to be supplied to the recording head 32. In the storage case 41, the liquid-level visual-check section 42 is a portion (the +Y-direction side surface of the storage case 41) through which the user can visually check the liquid level of the liquid stored in the ink tank 46. The storage case 41 has, in addition to the liquid-level visual-check section 42, an upper cover 44 that can be opened or closed. The upper cover 44 protects the ink tank 46. When the upper cover 44 is open, a liquid can be supplied from the refill container 50 (see FIG. 5) into an injection port 46*b* of the ink tank 46. As described above, the liquid storage section 40 stores a liquid to be supplied to the recording head 32 and includes the injection port 46*b* into which the liquid can be injected from the refill container 50 and the liquid-level visual-check section 42 through which the liquid level of the liquid can be visually checked.

The storage case 41 accommodates six ink tanks 46. The six ink tanks 46 includes an ink tank 46K1 that stores a black liquid that contains a black pigment as colorant, an ink tank 46K2 that stores a black liquid that contains a black dye as colorant, an ink tank 46GR that stores a gray liquid that contains a gray dye as colorant, an ink tank 46C that stores a cyan liquid that contains a cyan pigment as colorant, an ink tank 46M that stores a magenta liquid that contains a magenta pigment as colorant, and an ink tank 46Y that stores a yellow liquid that contains a yellow pigment as colorant. In the liquid storage section 40, the ink tank 46K1 that stores a black liquid that contains a black pigment as colorant, the ink tank 46K2 that stores a black liquid that contains a black dye as colorant, the ink tank 46GR that stores a gray liquid that contains a gray dye as colorant, the ink tank 46C that stores a cyan liquid that contains a cyan pigment as colorant, the ink tank 46M that stores a magenta liquid that contains a magenta pigment as colorant, and the ink tank 46Y that stores a yellow liquid that contains a yellow pigment as colorant are arranged in the +X direction.

It should be noted that the number of the ink tanks 46 accommodated in the storage case 41 is not limited to six, and may be less than six or more than six. The colorant contained in the liquid may be pigment or dye. Furthermore, the liquid may contain no colorant.

The black liquid that contains a black pigment as colorant is less likely to bleed, and is suitable for recording, for example, characters and markers the black liquid that contains a black dye as colorant has high color reproducibility, and is suitable for recording, for example, photographs. Accordingly, the black liquid that contains a black pigment as colorant is used for monochrome printing, printing of markers, and the like. The black liquid that contains a black dye as colorant is used for printing photographs and the like. Furthermore, recording an intermediate color between white and black with a gray liquid that contains a gray dye as colorant increases color reproducibility, and thus the gray liquid that contains a gray dye as colorant is used for printing photographs and the like.

The ink tank 46 includes a body section 46*a* that stores a liquid, the injection port 46*b* from which the liquid can be injected from the refill container 50, and a cap member 46*c*. One end of the cap member 46*c* is used as a rotation axis and the other end can be turned with respect to the body section 46*a*. The cap member 46*c* seals the injection port 46*b* to suppress drying of the liquid that is stored in the body section 46*a*. The body section 46*a* is made of a transparent or translucent material, and the liquid that is stored in the body section 46*a* can be visually checked from the outside. Furthermore, the body section 46*a* has a graduation line 48 that indicates that no liquid is provided and a graduation line 49 that indicates that the liquid is fully provided. The surface of the body section 46*a* on which the graduation lines 48 and 49 are provided is a visual-check surface 47.

The liquid-level visual-check section 42 has openings 43 for exposing the respective visual-check surfaces 47 of the six ink tanks 46. Through the openings 43 in the liquid-level visual-check section 42, the user can visually check the visual-check surfaces 47 of the ink tanks 46. In other words, the user can observe the liquid level check surfaces 47 of the ink tanks 46 through the liquid-level visual check section 42 to visually check the liquid levels of the liquids in the ink tanks 46 and properly grasp the remaining amounts of the liquids in the ink tanks 46 with the graduation lines 48 and 49.

In order to facilitate the visual check of the remaining amounts of the liquids in the ink tanks 46 for the users of the recording apparatus 1, the same dark color is used for the liquid-level visual-check section 42 and for the casing 17 in the display section 15. More specifically, the color of the liquid-level visual-check section 42 and the color of the casing 17 in the display section 15 are black. When a user reads the graduation lines 48 and 49 and determines that the remaining amounts of the liquids in the ink tanks 46 are low, as illustrated in FIG. 5, the user opens the scanner section 10 with respect to the apparatus body 3, and inserts the refill container 50 into the injection port 46*b* of the ink tank 46 to refill the ink tank 46 with the liquid from the refill container 50.

As described above, the recording apparatus 1 includes the ink tanks 46 that can be refilled with the respective liquids from the corresponding refill containers 50, and when the remaining amount of the liquid in one ink tank 46 becomes low, the user can supply the liquid from the refill container 50 into the ink tank 46. In the recording apparatus that includes the ink tanks that can be refilled with the respective liquids from the corresponding refill containers by a user, however, the user may improperly inject (refill) a liquid into a wrong ink tank, and the liquid may not be properly supplied into the ink tank and spill from the ink tank. Furthermore, the liquid spilled from the ink tank may adhere to electrical components of the recording apparatus and cause a failure in the recording apparatus (electrical components), or may soil around the recording apparatus.

For example, the user may mistakenly refill an ink tank that contains a sufficient amount of liquid instead of an ink tank that contains a low amount of liquid, and the liquid may spill from the ink tank. In general, in a recording apparatus that includes an ink tank that can be refilled with a liquid from a refill container by a user, the shape of the refill container and the shape of the injection port of the ink tank are made such that the refill container can be inserted into only the injection port of the corresponding refill container. For example, a refill container that stores a yellow liquid can be inserted into only the injection port of an ink tank that stores the yellow liquid. However, in some cases, a user forcibly inserts a refill container into a wrong injection port of an ink tank that does not correspond to the refill container, and the liquid is unnecessarily mixed into the liquid that is stored in the wrong ink tank and the ink unnecessarily spill from the ink tank, or the liquid stored in the ink tank can no longer be used. For example, a user may forcibly insert a refill container that stores a yellow liquid into an injection port of an ink tank that stores a magenta ink, and the yellow liquid is mixed into the magenta liquid and the yellow ink may spill from the magenta ink tank, or the magenta liquid stored in the ink tank can no longer be used. As described above, the recording apparatus that includes the ink tanks that can be refilled with the respective liquids from the corresponding refill containers by a user may be mistakenly operated by a user who is unfamiliar with the liquid refilling operation, resulting in unexpected problems.

Furthermore, many users have not mastered the operations for the recording apparatus and are unfamiliar with the liquid refilling operation, and thus the recording apparatus may be subjected to the above-described improper operations, resulting in unexpected problems. To solve the problem, it is desirable to provide a user-friendly recording apparatus that allows users who are unfamiliar with the liquid refilling operation to understand the proper operations and properly perform the liquid refilling operation to the ink tanks. The recording apparatus 1 according to the embodiment is made for such users who are unfamiliar with the liquid refilling operation to the ink tank 46, and the operation for refilling the ink tank 46 with the liquid can be readily understood. In the recording apparatus 1, the ink tank 46 can be properly refilled with the liquid. Hereinafter, the configuration will be described in detail.

When the remaining amount of the liquid stored in the ink tank 46 becomes low and the ink tank 46 is refilled with the liquid, the user touches and selects an icon for indicating the liquid refilling operation that is displayed on the display section 15. In response to the toughing operation, the display section 15 displays images by frame-by-frame advance to provide visual guidance on the operation of refilling the ink tank 46 with the liquid. The images that are displayed on the display section 15 enables the user to visually check the operation of refilling the ink tank 46 with the liquid. The recording apparatus 1 visually indicates the operation of refilling the ink tank 46 with the liquid by the use of the images, and consequently, as compared with a configuration in which sentences that describe the liquid refilling operation to the ink tank 46 are displayed, the user who is unfamiliar with the liquid refilling operation to the ink tank 46 can properly grasp the liquid refilling operation to the ink tank 46.

After the completion of the guidance on the operation of refilling the ink tank 46, the user touches an icon for starting the liquid refilling operation to select the icon. Upon the selection, the display section 15 displays images to provide visual guidance on the position of the ink tank 46 to be refilled with the liquid, the type (for example, color) of the liquid to be refilled, and the like. The recording apparatus 1 visually indicates the information by the use of the images, and accordingly, as compared with the configuration in which sentences are displayed, users who are unfamiliar with the liquid refilling operation to the ink tank 46 can properly understand the position of the ink tank 46 to be refilled with the liquid, the type of refill liquid, and the refill container 50 that stores the refill liquid.

In the recording apparatus 1, the display section 15 for accept various setting operations is disposed near the liquid-level visual-check section 42. The display section 15 disposed near the liquid-level visual-check section 42 enables the user to check the information about the operation of refilling the ink tank 46 with the liquid while the user visually checking the images displayed on the display section 15 and the state of the liquid storage section 40. Accordingly, as compared with a configuration in which the user is required to respectively visually check the images displayed on the display section 15 and the state of the liquid storage section 40, the user can properly understand the operation of refilling the ink tank 46 with the liquid. If the display section 15 is disposed away from the liquid-level visual-check section 40 and the user cannot visually check the display section 15 and the liquid storage section 40 together, the user is required to respectively visually check the images displayed on the display section 15 and the state of the liquid storage section 40 while changing the user's line of sight to check the operation of refilling the ink tank 46 with the liquid. In such a case, the user is likely to mistakenly or improperly understand the operation, and may mistakenly refill the ink tank 46 with the liquid.

The recording apparatus 1 according to the embodiment enables users to properly understand the operation of refilling the ink tank 46 with ink by the use of the images that are visually displayed on the display section 15, and to properly grasp the information about the liquid refilling operation. Consequently, users who are unfamiliar with the liquid refilling operation to the ink tank 46 can properly perform the liquid refilling operation to the ink tank 46.

2. Second Embodiment

Figure 6:
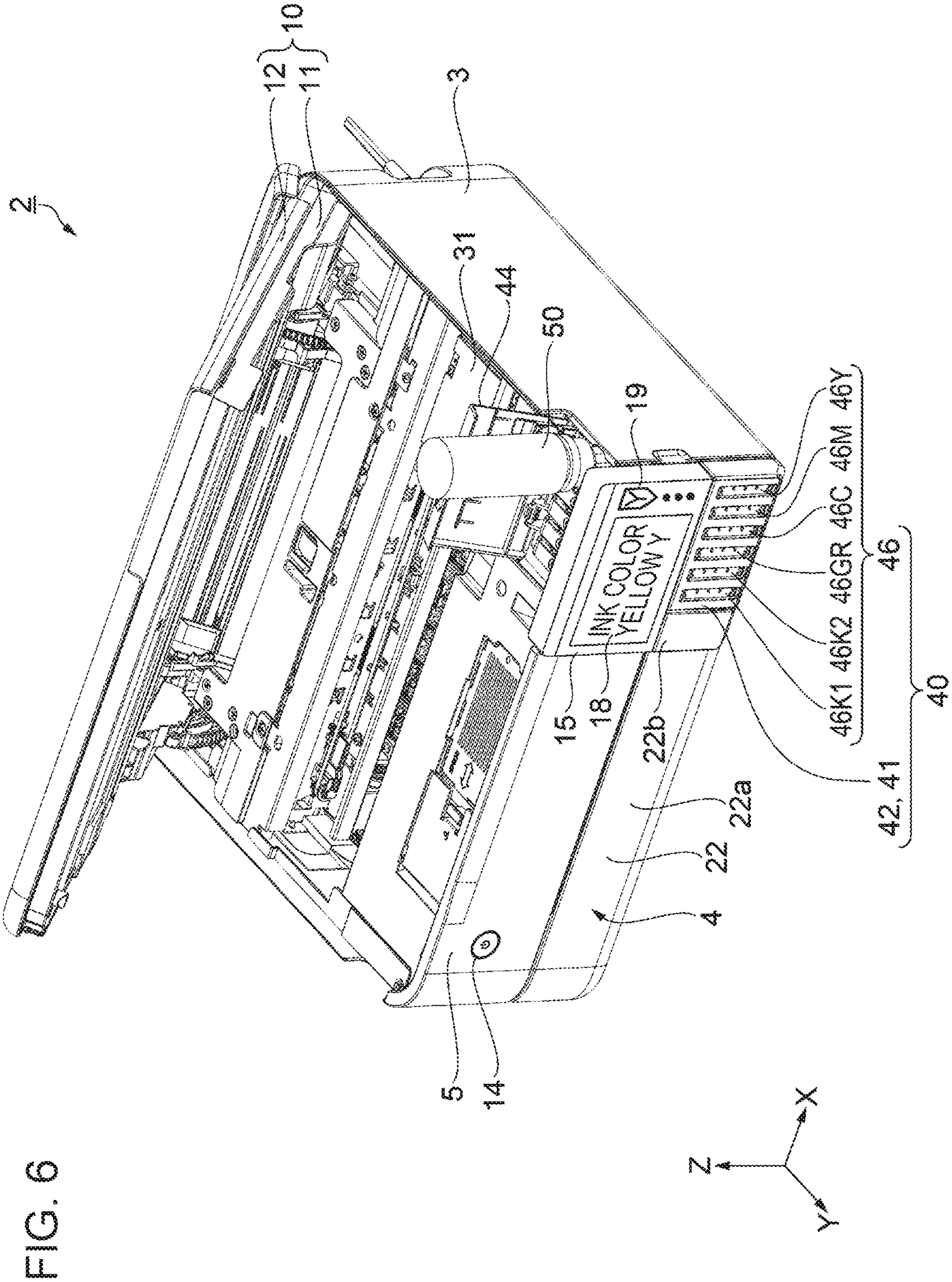
FIG. 6 is a perspective view of a recording apparatus according to a second embodiment.

FIG. 6 is a perspective view of a recording apparatus 2 according to a second embodiment, and corresponds to FIG. 5. The recording apparatus 2 according to the embodiment includes the display section 15 that is attached to the apparatus body 3. In the recording apparatus 1 according to the first embodiment, the display section 15 is attached to the upper cover 12 of the scanner section 10. The arrangement is a major difference between the second embodiment and the first embodiment. Hereinafter, with reference to FIG. 6, an overview of the recording apparatus 2 according to the embodiment will be described, focusing on differences from the first embodiment. To components similar to those in the first embodiment, the same reference numerals as those in the first embodiment are given to omit their overlapping descriptions.

As illustrated in FIG. 6, the display section 15 is attached to the apparatus body 3 and is disposed above the liquid-level visual-check section 42. The display section 15 cannot be turned together with the scanner section 10, but can be tilted with respect to the apparatus body 3. In the recording apparatus 2 according to the embodiment, when the scanner section 10 is opened with respect to the apparatus body 3 to refill the ink tank 46 with the liquid, the display section 15 is disposed near the liquid-level visual-check section 42 (liquid storage section 40). In contrast, in the first embodiment, when the scanner section 10 is opened with respect to the apparatus body 3 to refill the ink tank 46 with the liquid, the display section 15 is disposed away from the liquid-level visual-check section 42 (liquid storage section 40). In the recording apparatus 2 according to the embodiment, when the user refill the ink tank 46 with the liquid, the display section 15 for accept various setting operations is near the liquid-level visual-check section 42 (liquid storage section 40).

As illustrated in FIG. 6, in refilling the ink tank 46 with the liquid, an image 18 for indicating the color of the refill liquid and features (for example, shape and color) of the refill container 50 and an image 19 for indicating the position of the ink tank 46 to be refilled with the liquid are provided. The image 19 indicates the ink tank 46 to be refilled with the liquid, and thus the user can properly select the ink tank 46 to be refilled with the liquid without selecting a wrong ink tank 46. In addition, the image 18 indicates the color of the refill liquid and features (for example, shape and color) of the refill container 50, and the user can properly select the refill container 50 to be refilled with the liquid without selecting a wrong refill container 50.

Furthermore, in refilling the ink tank 46 with the liquid, the user can refill the ink tank 46 with the liquid while referring to the images displayed on the display section 15. Consequently, the user who is unfamiliar with the liquid refilling operation to the ink tank 46 can properly refill the ink tank 46 with the ink.

Modification

3. The liquid storage section 40 according to the above-described embodiments is disposed not in the carriage 31 but in the apparatus body 3; however, the liquid storage section 40 may be disposed in the carriage 31.

Contents derived from the embodiment will be described below.

A recording apparatus includes a carriage configured to move in a width direction intersecting a medium transport direction, a recording head mounted on the carriage, a liquid storage section configured to store a liquid to be supplied to the recording head, the liquid storage section including an injection port configured to receive the liquid from a refill container and a liquid-level visual-check section through which a liquid level of the liquid is visually checked, and a display section configured to accept various setting operations, in which the liquid-level visual-check section and the display section are disposed on an apparatus front surface side, and the display section is disposed above the liquid-level visual-check section.

A liquid-level visual-check section is a section through which a portion (for example, an ink tank) of a liquid storage section that stores a liquid can be visually checked. Through the liquid-level visual-check section, the user can grasp a position of the portion that stores the liquid and a position of a liquid level of the liquid. The display section configured to accept various setting operations is disposed above the liquid-level visual-check section and near the liquid-level visual-check section. By using the display section that is disposed near the liquid-level visual-check section, the user can visually check both the display section and the liquid-level visual-check section, and thus the user can refill the liquid storage section with the liquid while referring to the operation guidance that is displayed on the display section.

For example, when the user refills the liquid storage section with the liquid while visually checking the display section and the liquid-level visual-check section individually, the user memorizes the information that is displayed on the display section and then performs the operation of refilling the liquid storage section with the ink. In such a case, the user is likely to mistakenly or incorrectly remember the information, and improperly perform the operation of refilling the liquid storage section with the liquid. For example, by providing the information about the refill operation to be performed to the liquid storage section on the display section such that the user can visually grasp the information, the user can perform the operation of refilling the liquid storage section while referring to the operation displayed on the display section, and thus the user is not required to memorize the information that is displayed on the display section and can perform the operation of refilling the liquid storage section with the ink without mistakenly or incorrectly remember the operation.

The recording apparatus may further include a storage case accommodating the liquid storage section. The storage case has an opening through which the liquid-level visual-check section can visually checked, and a front surface of the storage case that has the opening and a surface of the display section may be flush with each other.

With the structure in which a front surface of the storage case having the opening and a surface of the display section are flush with each other, as compared with a structure in which a front surface of the storage case having the opening and a surface of the display section are not flush with each other, the display section is disposed near the storage case. Accordingly, the user can more readily refill the liquid storage section with the liquid while visually checking the display section and the storage case.

In the recording apparatus, the liquid-level visual-check section and the display section may be disposed in one end portion of the apparatus front surface in the width direction.

The arrangement in which the liquid-level visual-check section and the display section are disposed on one end portion of the apparatus front surface in the width direction enables the display section to be disposed above the liquid-level visual-check section, and thus the display section can be disposed near the liquid-level visual-check section.

In the recording apparatus, the liquid-level visual-check section and the discharge section may be adjacent to each other in the width direction.

With the structure in which the liquid-level visual-check section and the discharge section are adjacent to each other in the width direction, the liquid-level visual-check section is prevented from interfering with the discharge section. As compared with a structure in which the liquid-level visual-check section interferes with the discharge section, the user can more readily check the portion where the liquid is stored through the liquid-level visual-check section.

The recording apparatus may further include a sheet feed tray configured to feed the medium, and the liquid-level visual-check section and the sheet feed tray may be adjacent to each other in the width direction.

With the structure in which the liquid-level visual-check section and the sheet feed tray are adjacent to each other in the width direction, the liquid-level visual-check section is prevented from interfering with the sheet feed tray. As compared with a structure in which the liquid-level visual-check section interferes with the sheet feed tray, the user can more readily check the portion where the liquid is stored through the liquid-level visual-check section.

In the recording apparatus, the color of the liquid-level visual-check section and the color of a casing in the display section may be the same dark color.

The structure in which the color of the liquid-level visual-check section and the color of a casing in the display section are the same dark color enables the user to readily grasp the color of the liquid that is stored in the liquid storage section through the liquid-level visual-check section.

In the recording apparatus, the liquid-level visual-check section and the display section may protrude from the apparatus front surface in a direction intersecting the width direction.

With the liquid-level visual-check section and the display section that protrude in a direction that intersects the width direction, as compared with a structure in which the liquid-level visual-check section and the display section do not protrude in the direction that intersects the width direction, the volume of the portion where the liquid is stored in the liquid storage section can be increased, and thus the liquid storage section can store a large amount of liquid.

In the recording apparatus, when viewed in the direction intersecting the transport direction and the width direction, a part of the display section may overlap at least one of the discharge section and the sheet feed tray.

As compared with a structure in which a part of the display section does not overlap at least one of the discharge section and the sheet feed tray, in the structure in which a part of the display section overlaps at least one of the discharge section and the sheet feed tray, an area where the display section overlaps the discharge section and the sheet feed tray is narrow when viewed in the direction intersecting the transport direction and the width direction. Accordingly, the compact recording apparatus can be provided.

In the recording apparatus, the display section may be configured to be tilted.

With the display section that is configured to be tilted, the user can tilt the display section to a position for easy viewing and visually check operation guidance displayed on the display section.

The recording apparatus may further include a front door disposed on the apparatus front surface side in the width direction with respect to the liquid-level visual-check section, and when the apparatus front surface is viewed from the front side, an edge of the front door and front surfaces of the display section and the storage case may be disposed in the same line.

In the structure in which an edge of the front door and front surfaces of the display section and the storage vase are disposed in the same line, the front door is prevented from interfering with the display section and the liquid storage case, enabling the front door to be readily opened or closed.

The recording apparatus may further include a scanner section turnably attached to the apparatus body, in which the display section may be attached to an end of the scanner section, and may be configured to be turned together with the scanner section.

A scanner section and the display section can be turned together to expose the liquid storage section, and thus a large display section does not interfere with the operation of supplying the liquid from the refill container into the liquid storage section. With the structure, the large display section can be provided, and the user can readily visually check operation guidance that is displayed on the display section.

In the recording apparatus, the liquid supplied to the recording head may be suppled from the liquid storage section through a tube.

What is claimed is:

1. A recording apparatus comprising:

a carriage configured to move in a width direction intersecting a medium transport direction;

a recording head mounted on the carriage;

a liquid storage section configured to store a liquid to be supplied to the recording head, the liquid storage section including an injection port configured to receive the liquid from a refill container and a liquid-level visual-check section through which a liquid level of the liquid is visually checked; and a display section configured to accept various setting operations, wherein the liquid-level visual-check section and the display section overlap in the width direction.

2. The recording apparatus according to claim 1, wherein the display section is disposed above the liquid-level visual-check section.

3. The recording apparatus according to claim 1, wherein the display section extends to an inner side in the width direction than the liquid-level visual-check section.

4. The recording apparatus according to claim 1, wherein a length of the display section in the width direction is longer than a length of the liquid-level visual-check section in the width direction.

5. The recording apparatus according to claim 1, wherein the display section protrudes from a front surface of the apparatus in a direction intersecting the width direction.

6. The recording apparatus according to claim 1, further comprising an upper cover turnably attached to the apparatus, and covering the carriage, wherein the display section is attached to an end of the upper cover, and is configured to be turned together with the upper cover.

7. The recording apparatus according to claim 6, wherein the upper cover is a scanner unit on which a document is mounted, and which reads the document.

8. The recording apparatus according to claim 1, wherein a color of the display section is a dark color.

9. The recording apparatus according to claim 1, wherein the liquid storage section stores a black liquid.

10. The recording apparatus according to claim 9, wherein the black liquid contains black pigment as colorant.

11. The recording apparatus according to claim 1, further comprising a discharge section configured to discharge a medium, wherein the liquid-level visual-check section and the discharge section are adjacent to each other in the width direction.

12. The recording apparatus according to claim 1, further comprising a sheet feed tray configured to feed the medium, wherein the liquid-level visual-check section and the sheet feed tray are adjacent to each other in the width direction.

13. The recording apparatus according to claim 1, further comprising a discharge section configured to discharge the medium, and a sheet feed tray configured to feed the medium, wherein when viewed in the direction intersecting the transport direction and the width direction, a part of the display section overlaps at least one of the discharge section and the sheet feed tray.

14. The recording apparatus according to claim 1, further comprising a discharge section configured to discharge the medium, and a sheet feed tray configured to feed the medium, wherein the discharge section is disposed above the sheet feed tray.

15. The recording apparatus according to claim 1, wherein the display section is configured to be tilted.

16. The recording apparatus according to claim 1, wherein the liquid supplied to the recording head is suppled from the liquid storage section through a tube.

17. The recording apparatus according to claim 1, wherein at least a part of the liquid-level visual-check section is disposed at a same location with the display section in the width direction.

18. The recording apparatus according to claim 1, wherein the display section displays an image for indicating the liquid refilling operation.

19. The recording apparatus according to claim 18, wherein the liquid-level visual-check section and the image of the display section overlap in the width direction.

20. A recording apparatus comprising:

a carriage configured to move in a width direction intersecting a medium transport direction;

a recording head mounted on the carriage;

a liquid storage section configured to store a liquid to be supplied to the recording head, the liquid storage section including an injection port configured to receive the liquid from a refill container and a liquid-level visual-check section through which a liquid level of the liquid is visually checked; and a display section configured to display information and to accept various setting operations, wherein the liquid-level visual-check section and the display section are disposed on an apparatus front surface side, and the display section is disposed above the liquid-level visual-check section, and wherein at least a part of the liquid-level visual-check section is disposed at a same location with the display section in the width direction.

* * * * *